United States Patent [19]
Cox et al.

[11] Patent Number: 6,010,169
[45] Date of Patent: Jan. 4, 2000

[54] AUTOMOTIVE BUMPER

[75] Inventors: Andrew Cox, Milan, Italy; Marcus Ashmore, Novi, Mich.; Mark P. Birka, Northville, Mich.; Kenneth J. Williams, Lake Orion, Mich.

[73] Assignee: Chrysler Corporation, Auburn Hills, Mich.

[21] Appl. No.: 09/096,106

[22] Filed: Jun. 11, 1998

[51] Int. Cl.⁷ .................................................. B60R 19/08
[52] U.S. Cl. ........................... 293/120; 293/121; 293/155
[58] Field of Search ..................................... 293/120, 155, 293/121, 142

[56] References Cited

U.S. PATENT DOCUMENTS

| | | |
|---|---|---|
| 4,483,559 | 11/1984 | Lewis et al. . |
| 4,563,028 | 1/1986 | Ogawa et al. . |
| 4,623,182 | 11/1986 | Trabert et al. . |
| 4,765,665 | 8/1988 | Akahoshi . |
| 4,826,226 | 5/1989 | Klie et al. ................................ 293/120 |
| 4,830,416 | 5/1989 | Matsuoka . |
| 4,875,728 | 10/1989 | Copp et al. . |
| 4,877,279 | 10/1989 | Logan . |
| 5,066,057 | 11/1991 | Furuta et al. . |
| 5,092,643 | 3/1992 | Okamoto et al. . |
| 5,108,138 | 4/1992 | Kawaguchi . |
| 5,154,462 | 10/1992 | Carpenter . |
| 5,226,695 | 7/1993 | Flint et al. . |
| 5,271,650 | 12/1993 | Fukuhara et al. . |
| 5,290,078 | 3/1994 | Bayer et al. . |
| 5,431,464 | 7/1995 | Jones et al. . |
| 5,498,044 | 3/1996 | Bovelian et al. ................... 293/155 X |
| 5,580,109 | 12/1996 | Birka et al. . |

*Primary Examiner*—Joseph D. Pape
*Attorney, Agent, or Firm*—Roland A. Fuller, III

[57] ABSTRACT

An automotive bumper assembly preferably includes a resilient attachment strip secured to the bumper assembly's inner structural bumper member. The attachment strip includes resilient fingers with preferably hook-shaped edge portions that mate and interlock with preferably hook-shaped edge portions of an outer decorative fascia member. This configuration allows the fascia member to be conveniently snapped into place on the structural inner bumper member with only minimal clearance being needed for a secure attachment.

28 Claims, 4 Drawing Sheets

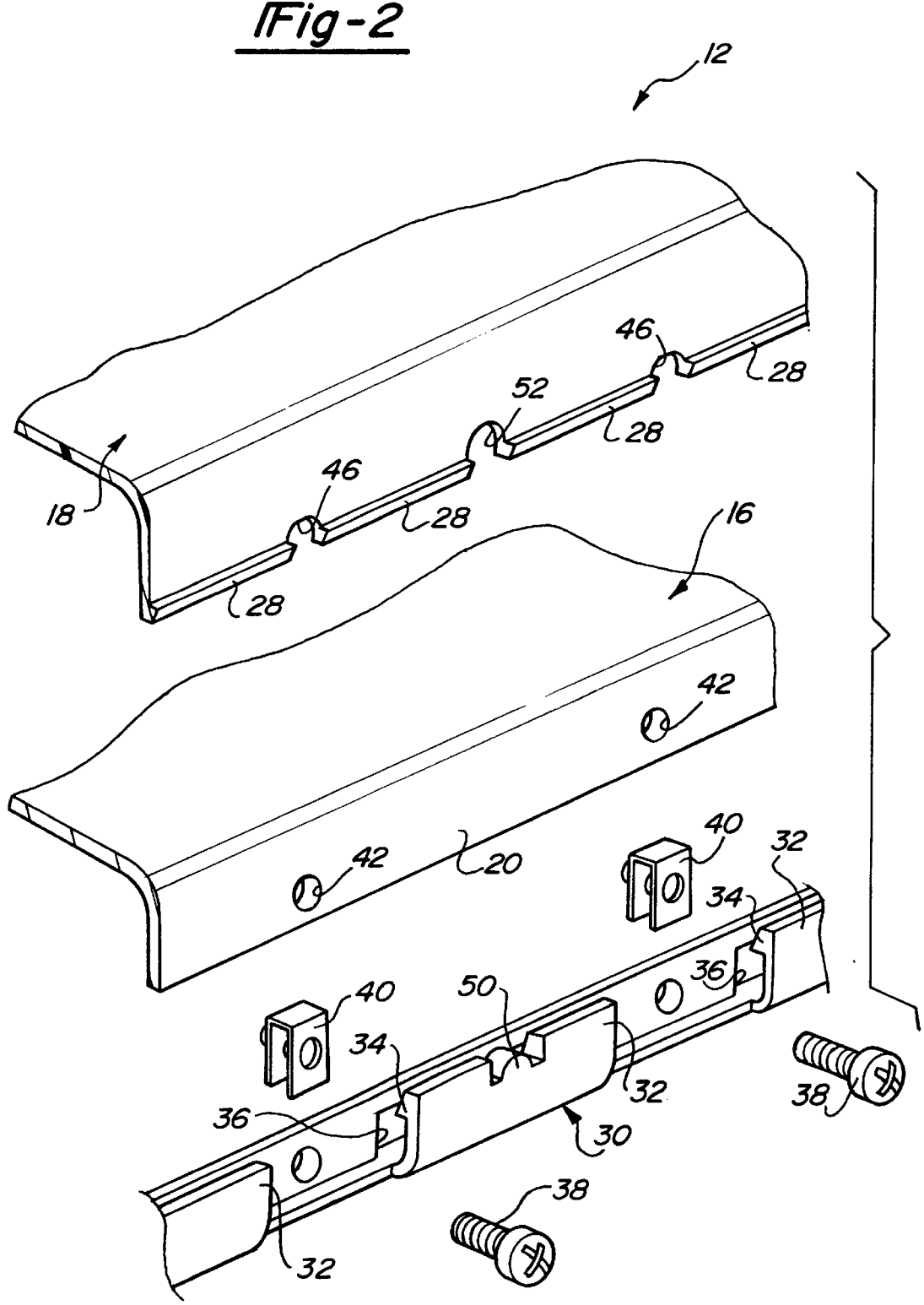

AUTOMOTIVE BUMPER

BACKGROUND AND SUMMARY OF THE INVENTION

The present invention relates generally to bumper assemblies for automotive vehicles and more particularly to reinforcement attachments for securing an outer fascia member to an inner structural bumper member.

Many typical automotive bumper designs include an outer decorative fascia member, which can be of a color and trim scheme that is complementary to that of the automotive vehicle body. Such a fascia is secured to, and substantially covers, a structural reinforcement bumper member adapted to absorb impacts from low-speed collisions. The bumper reinforcement member is designed to absorb the energy of such a collision while the vehicle itself remains undamaged, often with little or no damage to the decorative outer fascia member itself. Typically, in such designs, the outer fascia member is composed of a flexible and resilient synthetic material that is molded to a desired shape and configuration. Conventional fasteners are typically inserted through the top of the bumper reinforcement member and into or through a portion of the fascia member that extends between the bumper reinforcement member and the radiator or radiator support structure such that the fasteners are not exposed and do not, therefore, detract from the appearance of the fascia member or the vehicle. However, in many vehicles equipped with such bumper assemblies, the engine-cooling radiator or the radiator's support structure does not allow adequate clearance for the use of such conventional fasteners to attach the fascia member to the structural bumper reinforcement member.

In accordance with the present invention, this problem of inadequate fastener clearance is addressed by the use of an attachment strip (preferably composed of a resilient plastic or other strong but lightweight synthetic material) having at least one resilient finger member with a preferably hook-shaped discontinuity that mates with a corresponding discontinuity (also preferably hook-shaped) on the fascia member. This allows the fascia member to be securely snapped into place on the bumper reinforcement member after the attachment strip has been mounted thereon. Although the discontinuities on the attachment strip finger members and on the fascia member can each be a single continuous discontinuity extending along substantially the entire length of the attachment strip and the fascia member, respectively, the preferred arrangement is a series of discrete finger members and fascia discontinuities spaced apart along the fascia and bumper reinforcement members.

In its preferred form, the attachment strip has a series of windows that are longitudinally aligned and substantially coextensive with the resilient finger members in order to allow the attachment strip to be fabricated with a conventional two-piece mold apparatus. Also in a preferred form of the invention, the attachment member has a centered locator lug or other such locator protrusion that is adapted to be received by a corresponding centered locator opening or notch in the fascia member when the two are snapped together. This allows the fascia to be easily and conveniently located centered on the attachment strip (and thus on the bumper reinforcement member) during assembly.

Additional objects, advantages, and features of the present invention will become apparent from the following description and the appended claims, taken in conjunction with the accompanying drawings.

BRIEF DESCRIPTION OF THE DRAWINGS

FIG. 2 is a partial exploded bottom perspective view, illustrating the components of a bumper assembly according to the present invention.

DETAILED DESCRIPTION OF THE PREFERRED EMBODIMENTS

Figure 1:
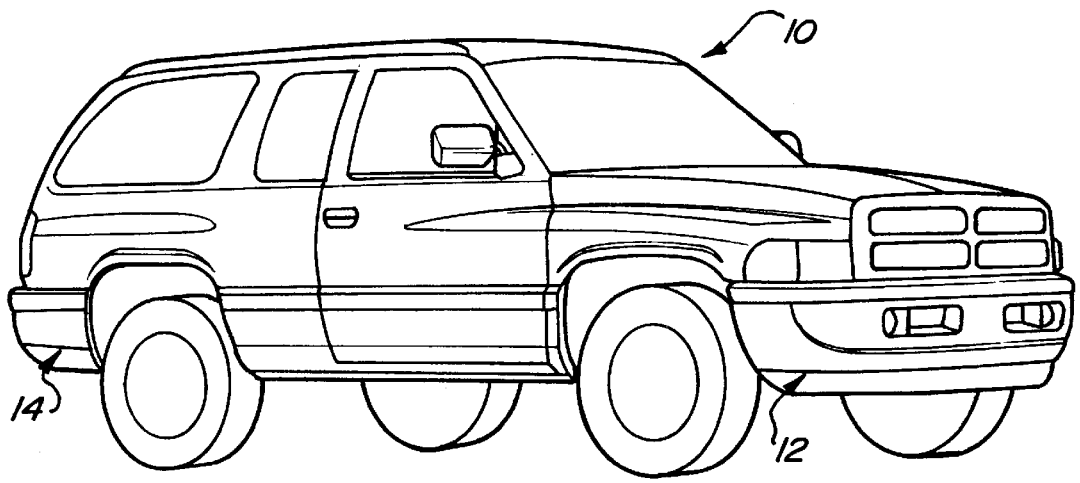
FIG. 1 is a perspective view of an exemplary automotive vehicle with one or both of its bumper assemblies in accordance with the present invention.
Figure 3:
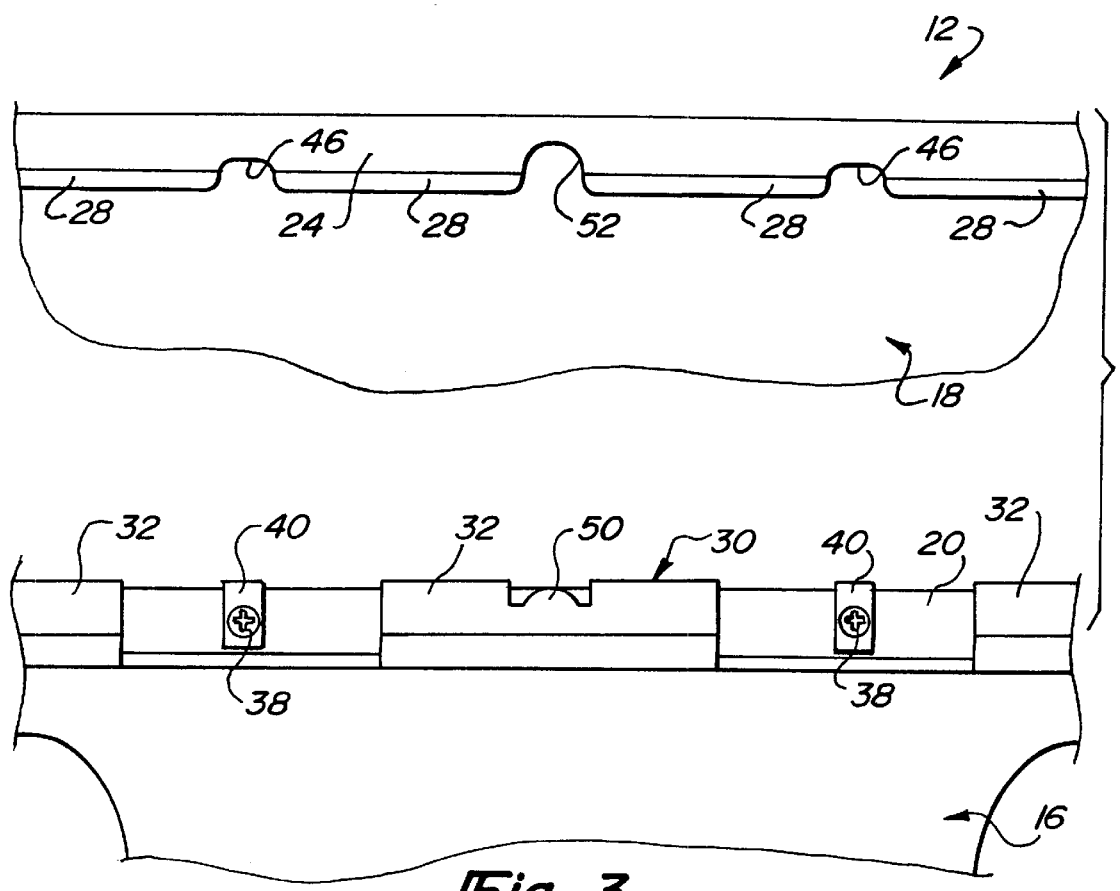
FIG. 3 is a bottom view of a bumper assembly according to the present invention, just prior to the fascia being snapped into place.
Figure 4:
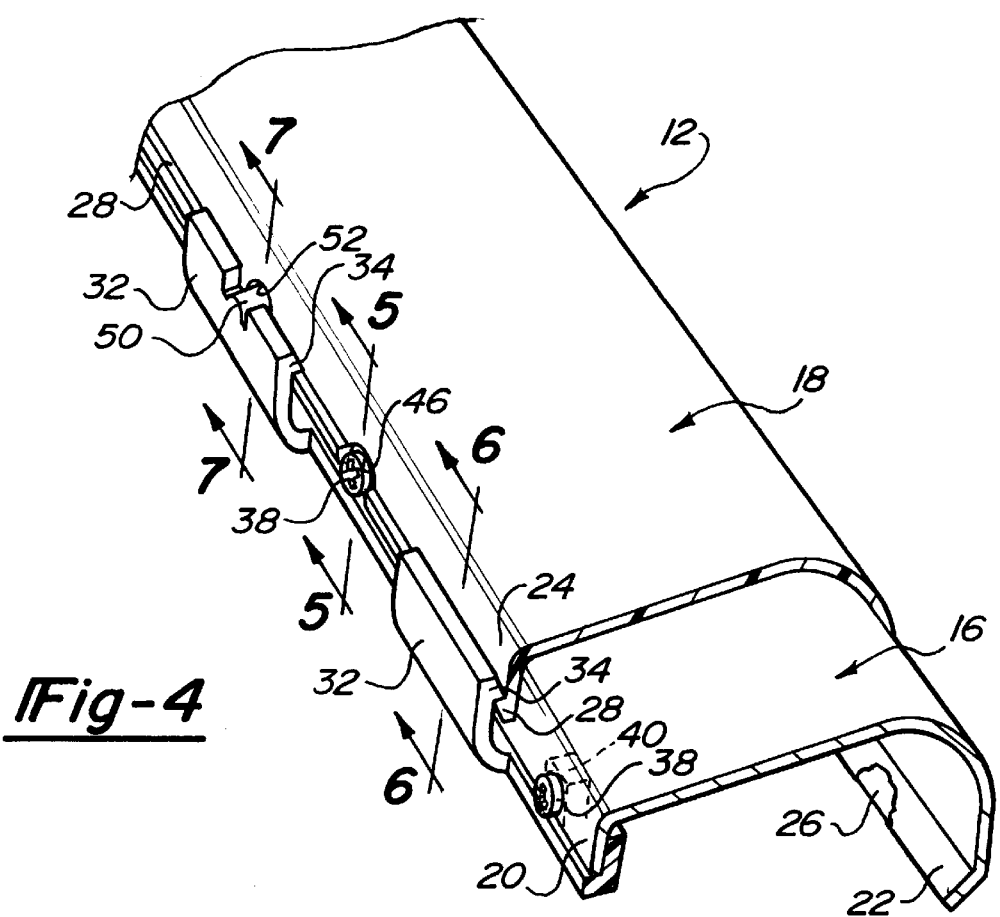
FIG. 4 is a partial bottom perspective view of an assembled bumper assembly according to the present invention.
Figure 5:
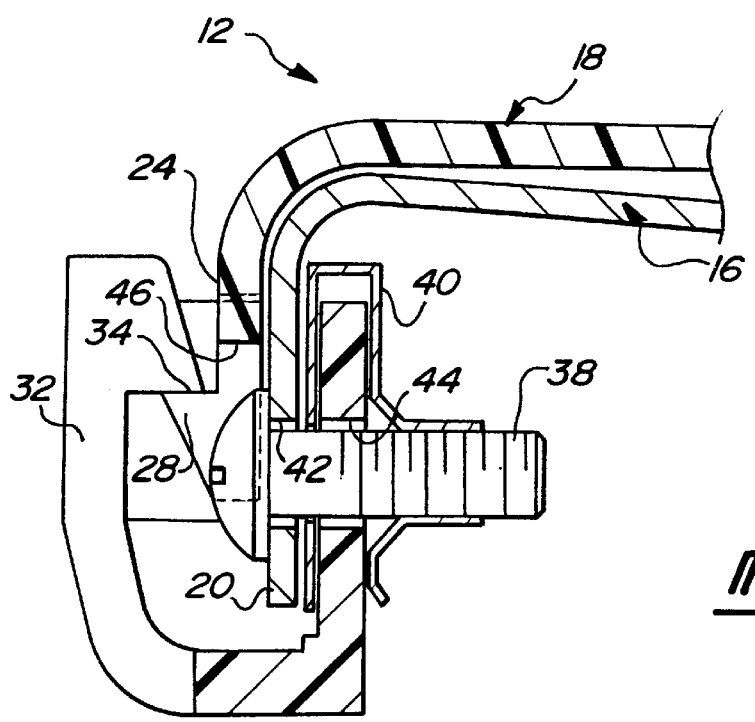
FIG. 5 is a partial cross-sectional view of the assembled bumper apparatus, taken generally along line 5—5 of FIG. 4.
Figure 6:
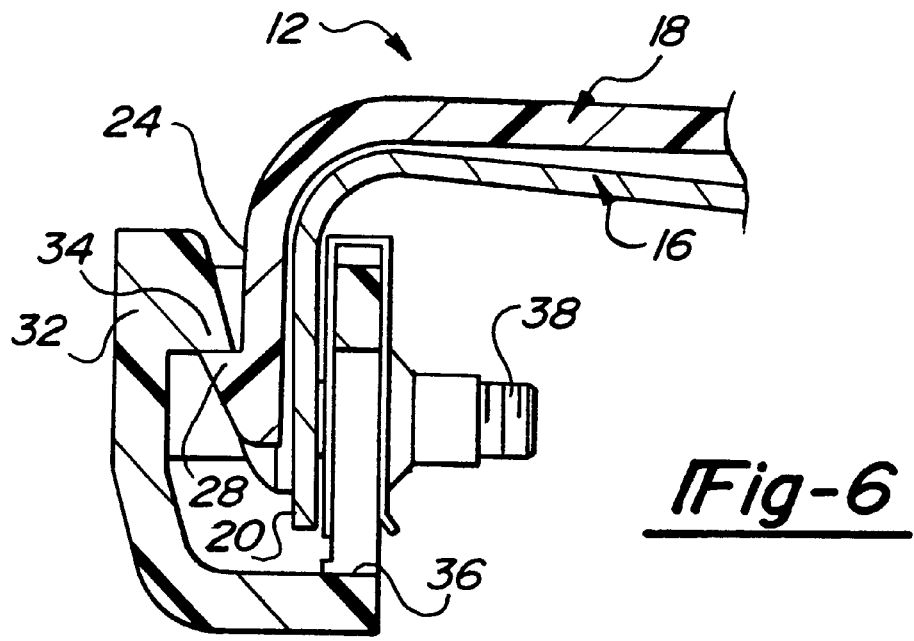
FIG. 6 is a partial cross-sectional view of the assembled bumper apparatus, taken generally along line 6—6 of FIG. 4.
Figure 7:
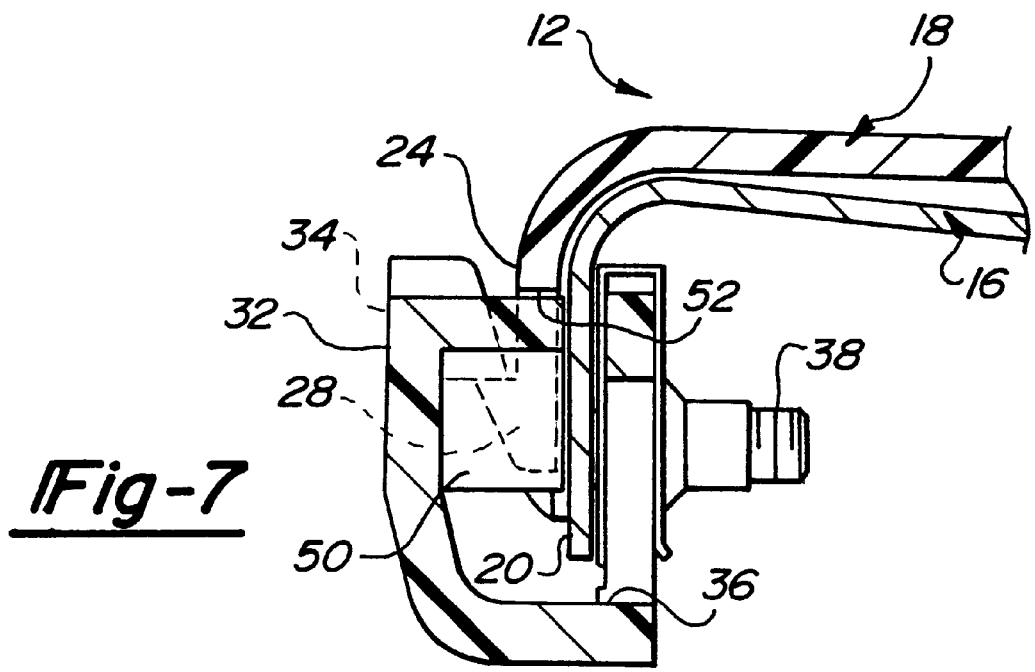
FIG. 7 is a partial cross-sectional view of the assembled bumper apparatus, taken generally along line 7—7 of FIG. 4.

FIGS. 1 through 7 depict exemplary and illustrative embodiments of an automotive bumper assembly according to the present invention. One skilled in the art will readily recognize from the following discussion that the principles of the present invention are equally applicable to bumper assemblies having shapes or configurations other than those depicted for purposes of illustration in the drawings. It should also be noted that the shape of the bumper assembly components illustrated in FIGS. 2 through 7 does not exactly match that of the front and rear bumper assemblies shown on the vehicle illustrated in FIG. 1. For purposes of clarity, however, the shape of the bumper assembly components in FIGS. 2 through 7 has been simplified.

In FIG. 1, a vehicle 10 includes a front bumper assembly 12 and a rear bumper assembly 14. Although the illustrations of FIGS. 2 through 7 depict a simplified front bumper assembly 12, it should be recognized that the principles of the invention shown in FIGS. 2 through 7 are equally applicable to the rear bumper assembly 14. Also, it should be recognized that the fascia attachment illustrated in the drawings can be employed on either the upper or the lower flanges (or on both) of the fascia member and the inner structural bumper member.

In FIGS. 2 through 7, the bumper assembly 12 includes an inner structural bumper member 16, having a lower bumper flange 20 and an upper bumper flange 22 thereon. The bumper assembly 12 also includes an outer fascia member 18 similarly having a lower fascia flange 24 and an upper fascia flange 26. A preferred series of discrete fascia discontinuities 28 (which are preferably of a generally hooked-shaped cross-sectional configuration) are spaced apart along substantially the entire length of an edge of the lower fascia flange 24.

An attachment strip 30, which is preferably composed of a resilient plastic or other similar high-strength lightweight material, extends along an inner side of the lower bumper flange 20. The attachment strip 30 has a preferred series of discrete finger portions 32, which extend outwardly and upwardly from an edge portion of the attachment strip 30 and are generally parallel to, but spaced-apart from, the main body portion of the attachment strip 30. The resilient fingers 30 each include preferably hook-shaped finger discontinuities 34 along their free edges, with the hook-shaped finger discontinuities 34 oriented in an opposite direction from the hook-shaped fascia discontinuities 28, with the corresponding discontinuities facing generally toward each other. As can perhaps best be seen in FIGS. 2 through 4, this arrangement allows the lower fascia flange 24 of the fascia member 18 to be snapped into a secure engagement with the attachment strip 30.

The attachment strip 30 can be secured to the lower bumper flange 20 by way of conventional threaded male fasteners 38, for example. The fasteners 38 extend through a series of openings 42 in the lower bumper flange 20 and a corresponding series of openings 44 in the attachment strip 30, where the fasteners 38 threadably engage conventional U-nut clips that resiliently grip the main body portion of the attachment strip 30, as illustrated, for example, in the cross-sectional view of FIG. 5. In this regard, the lower fascia flange 24 preferably includes a series of spaced-apart cut-out recesses 46, which provide clearance for the head portions of the illustrated male fasteners 38. Thus, as can be seen in FIGS. 4 through 7, both the lower bumper flange 20 and the lower fascia flange 24 are sandwiched between the main body portion of the attachment strip 30 and the attachment strip's resiliently deflectable fingers 32 when the fascia 18 is snapped into place. This provides for a secure, rattle-free attachment of the fascia member 18 to the inner structural bumper members 16, with no fasteners visible from the exterior of the vehicle 10, when viewed from a normal viewing perspective. It should be noted, however, that other well-known fastener types can alternately be used to secure the attachment strip 30 onto the inner bumper member 16.

In order to facilitate the ease and economy of the fabrication of the attachment strip 30, the attachment strip's main body portion preferably includes a series of finger windows or other openings 36 that correspond with the number of resiliently-deflectable fingers 32. The finger windows 36 are generally aligned with, and substantially coextensive with, the fingers 32. This configuration allows the attachment strip 30 to be easily and economically fabricated in a conventional two-piece molding apparatus.

Also for purposes of ease and economy of assembly, a locator lug 50 is provided, preferably on one of the fingers 32 and preferably at the center of the length of the attachment strip 30. Correspondingly, a locator opening or notch 52 is provided on the corresponding (preferably center) location of the lower fascia flange 24. The locator opening 52 on the fascia member 18 is configured to receive the locator lug 50 on the central finger 32 of the attachment strip 30, thus providing for easy and convenient alignment of the fascia member 18 with the attachment strip 30 and the inner structural bumper member 16 when the fascia member 18 is securely snapped into place.

The foregoing discussion discloses and describes merely exemplary embodiments of the present invention for purposes of illustration. One skilled in the art will readily recognize from such discussion, and from the accompanying drawings and claims, that various changes, modifications, and variations can be made therein without departing from the spirit and scope of the invention as defined in the following claims.

What is claimed is:

1. In an automotive bumper assembly having an elongated inner structural bumper member and an elongated outer fascia member attached thereto, the inner structural bumper member having an upper bumper flange thereon and a lower bumper flange thereon, and the fascia member having an upper fascia flange portion thereon and a lower fascia flange portion thereon, at least one of the upper and lower bumper and fascia flange portions being adapted to be interconnected to each other in order to secure the fascia member to the bumper member, the improvement comprising an elongated intermediate attachment strip having a main body portion extending along at least a substantial portion of the length of the bumper member, and being secured to the one of the upper and lower bumper flange portions of the bumper member, at least one resiliently deflectable finger portion extending from said attachment strip body portion and having a finger discontinuity adjacent an edge portion of said finger portion, said fascia member having a fascia discontinuity adjacent an edge portion of one of the upper and lower fascia flange portions, said finger discontinuity on said finger portion of said attachment strip resiliently and interlockingly engaging said fascia discontinuity in order to secure the fascia member to the bumper member.

2. The improvement according to claim 1, wherein said attachment strip is secured to the lower bumper flange portion, and said fascia discontinuity is adjacent an edge of the lower fascia flange portion.

3. The improvement according to claim 1, wherein said resiliently deflectable finger portion extends generally parallel to and is spaced from said attachment strip body portion, said fascia discontinuity interlockingly engaging said finger discontinuity generally between said finger portion and said attachment strip body portion.

4. The improvement according to claim 3, wherein said attachment strip body portion is secured to an opposite side of said one of the upper and lower bumper flange portions from said interlocking engagement of said finger and fascia discontinuities.

5. The improvement according to claim 1, wherein said attachment strip has a locator lug thereon, the fascia member having a corresponding locator opening therein for receiving said locator lug therein when said finger and fascia discontinuities are interlockingly engaged with each other in order to secure the fascia member to the bumper member at a predetermined location thereon.

6. The improvement according to claim 5, wherein said locator lug and said locator opening are disposed generally at the center of the lengths of the bumper member and the fascia member, respectively.

7. The improvement according to claim 1, wherein said intermediate attachment strip has a number of said finger portions located serially along at least a substantial portion of the length of said attachment strip body portion, said fascia member having a corresponding number of said fascia discontinuities located serially along at least a substantial portion of the length of said fascia member.

8. The improvement according to claim 7, wherein said attachment strip is secured to the lower bumper flange portion, and said fascia discontinuities are adjacent the edge portion of the lower fascia flange portion.

9. The improvement according to claim 6, wherein one of said finger portions of said attachment strip includes a locator lug thereon, a corresponding one of said fascia discontinuities having a locator opening therein for receiving said locator lug therein when said finger and fascia discontinuities are interlockingly engaged with each other in order to secure the fascia member to the bumper member at a predetermined location thereon.

10. The improvement according to claim 9, wherein said locator lug and said locator opening are disposed generally at the center of the lengths of the bumper member and the fascia member, respectively.

11. The improvement according to claim 10, wherein said attachment strip is secured to the lower bumper flange portion, and said fascia discontinuities are adjacent the edge portion of the lower fascia flange portion.

12. The improvement according to claim 1, wherein said finger and fascia discontinuities are both generally hook-shaped and face in opposite directions generally toward each other.

13. The improvement according to claim 1, wherein said one of the upper and lower bumper flanges has a number of bumper flange openings extending therethrough, said attachment strip body portion having a corresponding number of attachment strip openings extending therethrough, said attachment strip being secured to said one of the upper and lower bumper flanges by a corresponding number of fasteners extending through said bumper flange openings and said attachment strip openings.

14. The improvement according to claim 13, further including a U-nut clipped onto said one of the upper and lower bumper flanges at each of said bumper flange openings, each of said fasteners being a threaded male fastener threadably engaging one of said U-nuts.

15. In an automotive bumper assembly having an elongated inner structural bumper member and an elongated outer fascia member attached thereto, the inner structural bumper member having a lower bumper flange thereon, and the fascia member having a lower fascia flange portion thereon, the lower bumper and fascia flange portions being adapted to be interconnected to each other in order to secure the fascia member to the bumper member, the improvement comprising an elongated intermediate attachment strip having a main body portion extending along at least a substantial portion of the length of the bumper member, and being secured to the lower bumper flange portion of the bumper member, at least one resiliently deflectable finger portion extending from said attachment strip body portion and having a finger discontinuity adjacent an edge portion of said finger portion, said fascia member having a fascia discontinuity adjacent an edge portion of the lower fascia flange portion, said finger and fascia discontinuities being generally hook-shaped and facing in opposite directions generally toward each other, said finger discontinuity on said finger portion of said attachment strip resiliently and interlockingly engaging said fascia discontinuity in order to secure the fascia member to the bumper member, said resiliently deflectable finger portion extending generally parallel to and being spaced from said attachment strip body portion, said fascia discontinuity interlockingly engaging said finger discontinuity generally between said finger portion and said attachment strip body portion, said attachment strip body portion being secured to an opposite side of the lower bumper flange portions from said interlocking engagement of said finger and fascia discontinuities.

16. The improvement according to claim 15, wherein said attachment strip has a locator lug thereon, the fascia member having a corresponding locator opening therein for receiving, said locator lug therein when said finger and fascia discontinuities are interlockingly engaged with each other in order to secure the fascia member to the bumper member at a predetermined location thereon.

17. The improvement according to claim 16, wherein said locator lug and said locator opening are disposed generally at the center of the lengths of the bumper member and the fascia member, respectively.

18. The improvement according to claim 15, wherein said intermediate attachment strip has a number of said finger portions located serially along at least a substantial portion of the length of said attachment strip body portion, said fascia member having a corresponding number of said fascia discontinuities located serially along at least a substantial portion of the length of said fascia member.

19. The improvement according to claim 18, wherein one of said finger portions of said attachment strip includes a locator lug thereon, a corresponding one of said fascia discontinuities having a locator opening therein for receiving said locator lug therein when said finger and fascia discontinuities are interlockingly engaged with each other in order to secure the fascia member to the bumper member at a predetermined location thereon.

20. The improvement according to claim 19, wherein said locator lug and said locator opening are disposed generally at the center of the lengths of the bumper member and the fascia member, respectively.

21. The improvement according to claim 15, wherein the lower bumper flange has a number of bumper flange openings extending therethrough, said attachment strip body portion having a corresponding number of attachment strip openings extending therethrough, said attachment strip being secured to the lower bumper flange by a corresponding number of fasteners extending through said bumper flange openings and said attachment strip openings.

22. The improvement according to claim 21, further including a U-nut clipped onto the lower bumper flange at each of said bumper flange openings, each of said fasteners being a threaded male fastener threadably engaging one of said U-nuts.

23. In an automotive bumper assembly having an elongated inner structural bumper member and an elongated outer fascia member attached thereto, the inner structural bumper member having a lower bumper flange thereon, and the fascia member having a lower fascia flange portion thereon, the lower bumper and fascia flange portions being adapted to be interconnected to each other in order to secure the fascia member to the bumper member, the improvement comprising an elongated intermediate attachment strip having a main body portion extending along at least a substantial portion of the length of the bumper member and being secured to the lower bumper flange portion of the bumper member, a number of resiliently deflectable generally hook-shaped finger portions extending from said attachment strip body portion, each finger portion having a finger discontinuity adjacent edge portions of said finger portions, said fascia member having a corresponding number of generally hook-shaped fascia discontinuities adjacent an edge portion of the lower fascia flange portion, said corresponding hook shaped finger and fascia discontinuities facing in opposite directions generally toward each other, said finger discontinuity on said finger portion of said attachment strip resiliently and interlockingly engaging said fascia discontinuity in order to secure the fascia member to the bumper member, said resiliently deflectable finger portions extending generally parallel to and being spaced from said attachment strip body portion, said fascia discontinuities interlockingly engaging said finger discontinuity generally between said finger portion and said attachment strip body portion, said attachment strip body portion being secured to an opposite side of the upper and lower bumper flange portions from said interlocking engagement of said finger and fascia discontinuities, said attachment strip having a locator lug on one of said finger portions, the fascia member having a corresponding locator opening therein for receiving said locator lug therein when said finger and fascia discontinuities are interlockingly engaged with each other in order to secure the fascia member to the bumper member at a predetermined location thereon, said locator lug and said locator opening being disposed generally at the center of the lengths of the bumper member and the fascia member, respectively.

24. The improvement according to claim 23, wherein the lower bumper flange has a number of bumper flange openings extending therethrough, said attachment strip body portion having a corresponding number of attachment strip openings extending therethrough, said attachment strip being secured to the lower bumper flange by a corresponding number of fasteners extending through said bumper flange openings and said attachment strip openings.

25. The improvement according to claim 24, further including a U-nut clipped onto the lower bumper flange at each of said bumper flange openings, each of said fasteners being a threaded male fastener threadably engaging one of said U-nuts.

26. The improvement according to claim 24, wherein the lower fascia flange portion includes a number of cut-out recesses therein corresponding to said number of said fasteners, said recesses providing clearance for head portions of said corresponding fasteners.

27. The improvement according to claim 23, wherein said attachment strip body portion has a number of window openings extending therethrough, each of said window openings being longitudinally aligned with and spaced from a corresponding one of said finger portions, each of said window openings further having a longitudinal length generally equal to the longitudinal length of said corresponding one of said finger portions.

28. The improvement according to claim 23, wherein each of the bumper member and the fascia member also has an upper flange thereon, said upper bumper and fascia flanges also being adapted to be interconnected with each other.

* * * * *